April 19, 1938.　　　　　S. D. PRICE　　　　　2,114,401
GAS TESTING
Filed July 15, 1936　　　3 Sheets-Sheet 1
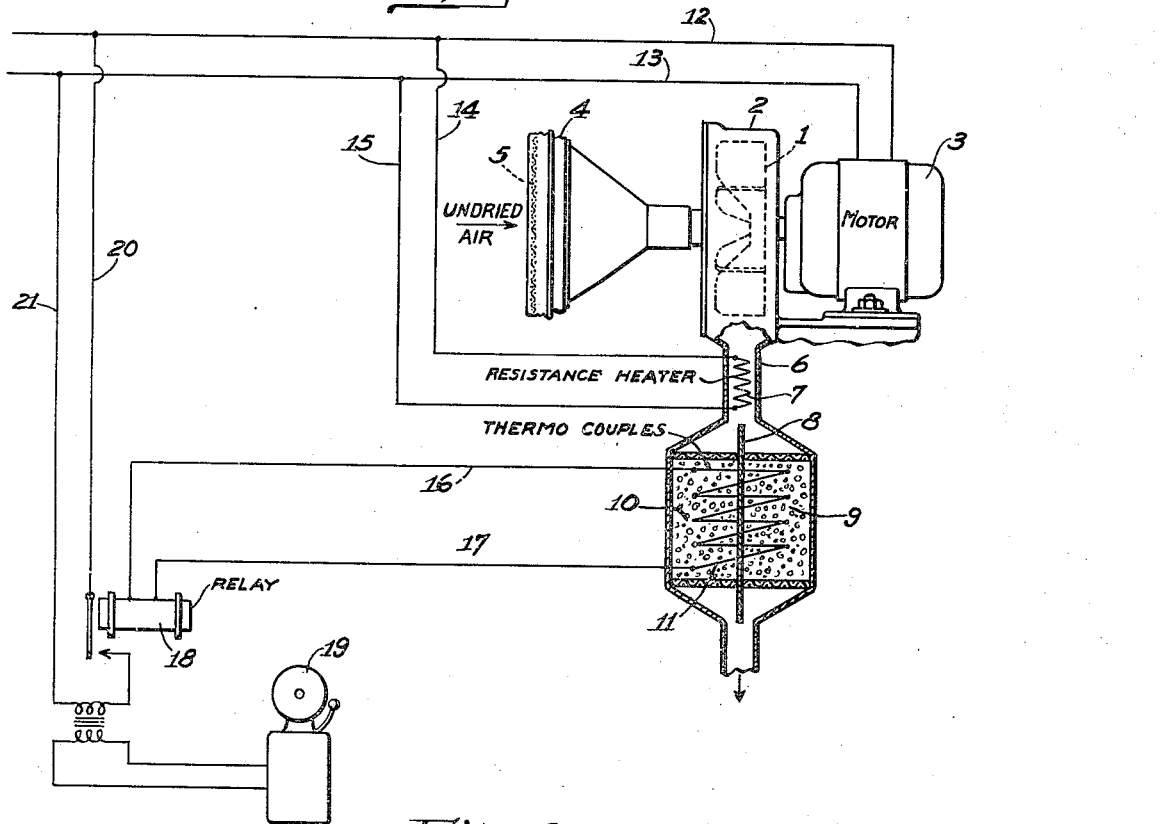
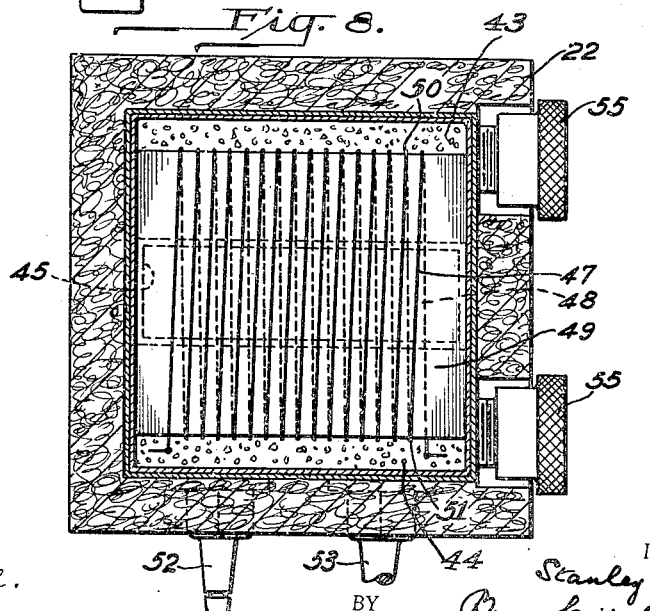
WITNESSES
A. B. Wallace.
E. O. Johns
INVENTOR.
Stanley D. Price
BY Brown, Critchlow & Flick
his ATTORNEYS.

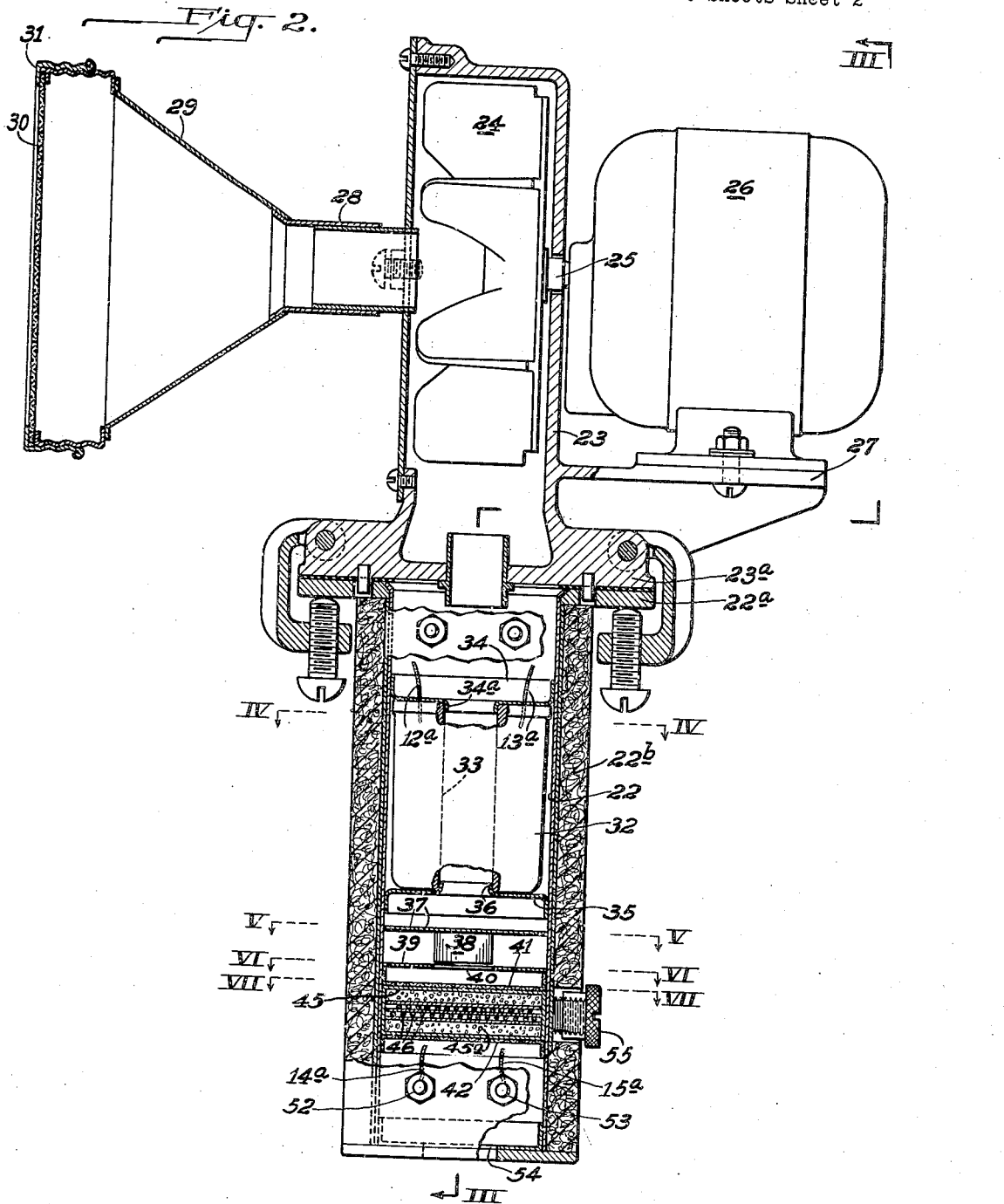

April 19, 1938.   S. D. PRICE   2,114,401
GAS TESTING
Filed July 15, 1936   3 Sheets-Sheet 3
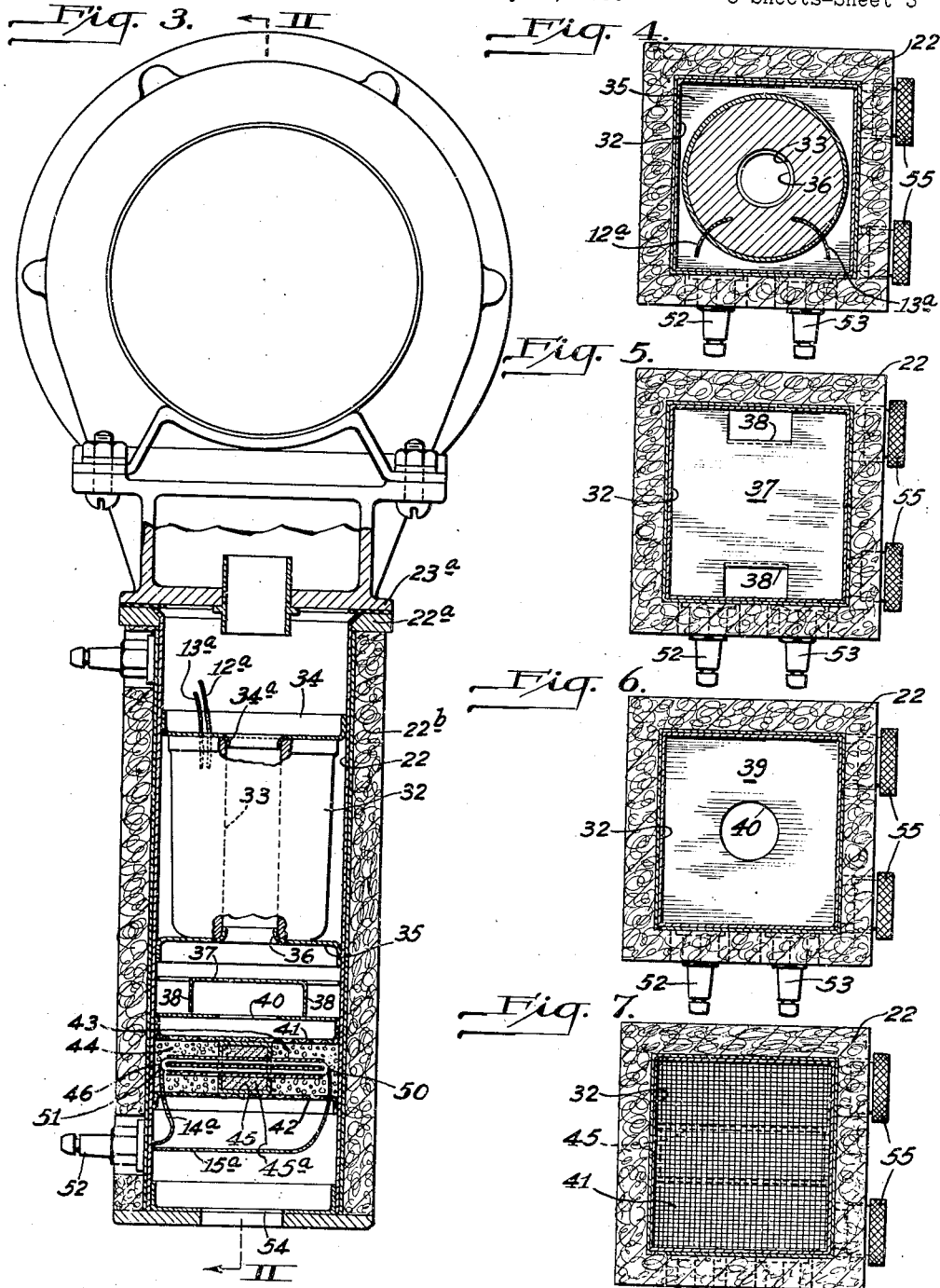
WITNESSES
A. B. Wallace
E. O. Johns
INVENTOR.
Stanley D. Price
BY Brown, Critchlow & Flick
his ATTORNEYS.

Patented Apr. 19, 1938

2,114,401

UNITED STATES PATENT OFFICE 2,114,401

GAS TESTING

Stanley D. Price, Pittsburgh, Pa., assignor to Mine Safety Appliances Company, Pittsburgh, Pa., a corporation of Pennsylvania Application July 15, 1936, Serial No. 90,713

8 Claims. (Cl. 177—311)

This invention relates to the determination of carbon monoxide and the like oxidizable constituents in gaseous atmospheres, such as air, and it is among the objects of the invention to provide a simple, easily practiced, efficient and reliable method of determining carbon monoxide in such atmospheres, which provides, either or both, for the determination of the concentration of carbon monoxide and for the giving of an alarm when the concentration reaches a predetermined value, which is adapted to be practiced under widely varying conditions, both industrial and domestic, does not require complicated or unduly expensive apparatus, and may be practiced automatically and with a minimum of human attention; a further object of the invention is to provide apparatus for practicing the method, which apparatus is simple, requires little attention, is compact and adapted for use both under industrial and domestic conditions of service, and is sturdy, reliable and accurate.

Carbon monoxide is recognized as being an important and major industrial and domestic hazard. The dangerous character of carbon monoxide arises not only from the widespread possibility of exposure to it, but also from its characteristics and the low concentrations capable of causing serious results. Thus, it may be encountered not only industrially, for example in factories, about industrial furnaces, in commercial garages, and other sources, particularly under conditions of inadequate ventilation, but also in the home, as from imperfect combustion of domestic fuels accompanied by inadequate or improper elimination of products of combustion, and in other ways, as from the running of automobile engines in garages associated with homes.

Carbon monoxide is a particularly dangerous gaseous poison because it is colorless and odorless, and because very low concentrations are capable of quickly causing serious, and even fatal, results. Thus, a concentration of but 2 parts of carbon monoxide in 10,000 parts of air may produce headache upon relatively short exposure. A concentration of only 6 parts in 10,000 parts of air may cause unconsciousness in, say, two hours, while as little as 10 parts in 10,000 may prove fatal in four hours. Of course, as the concentration increases the danger of fatal poisoning correspondingly increases, or, in other words, the tolerable period of exposure decreases. Furthermore, prolonged or frequently repeated exposure to very small concentrations of this gas may cause degenerative changes to occur in the body.

In view of the widespread possibility of exposure to dangerous concentrations of carbon monoxide it would be desirable to provide for the determination and indication of the presence and concentration of this gas in gaseous atmospheres, particularly in air, in both the home and industrial establishments. Obviously, such apparatus must be capable of providing reliable results without requiring much care and attention.

Apparatus for determining the concentration of carbon monoxide in air has been available but it has not been adapted for industrial and domestic use either because of the complicated character of the apparatus, because of its bulk, or because it has required rather constant attention and care.

All such apparatus have depended upon the catalytic combustion of the carbon monoxide, with application of the heat liberated to provide the desired indication. This has involved either determination of the change in resistance of a heated resistance wire, or determination of the temperature increase of a body of catalyst. The former procedure is inapplicable to widespread commercial use as a continuous indicator, and particularly to domestic use, because it involves the use of rather expensive apparatus involving complicated electrical wiring and expensive electrical equipment. To be of value for the purposes contemplated, such apparatus must function continuously, but with the apparatus heretofore available the use of resistance wires for obtaining the result is unsatisfactory because the wires change in diameter upon heating, and their life is rather short when heated continuously. Hence not only may the apparatus fail, due to filament failure, at a critical time, but also rather frequent zero checking is necessary to compensate for the progressive change in resistance due to evaporation of the filament. On the other hand, for the purposes contemplated by this invention, such an apparatus should be adapted to function automatically and accurately over long periods of time and with attention at only infrequent intervals.

Measurement of temperature change in a catalyst bed is capable of giving satisfactory results but this procedure suffers from the serious disadvantage that the catalysts capable of effecting oxidation of carbon monoxide at ordinary atmospheric temperatures are highly sensitive to, and are rapidly poisoned by, water vapor. Consequently, it has been necessary to include drying means for removing moisture from the air. This makes necessary, however, the use of a relatively heavy-duty fan or motor, or else the use of a large area of drier to provide a low flow resistance. But even with a fan of sufficient capacity, or with a large amount of drier, experience has shown that when the apparatus is used continuously the drier must be replaced as frequently as every twenty-four hours. Apparatus of such character is obviously bulky and expensive, which coupled with the need for at least daily attention renders it unsuited for industrial and domestic warning means.

The invention will be described in connection with the accompanying drawings in which Fig. 1 is a view representing schematically an apparatus, and associated wiring, adapted for use in the practice of the invention; Fig. 2 a longitudinal cross-section through the preferred embodiment of the apparatus provided by the invention, taken on line II—II, Fig. 3; Fig. 3 a cross-sectional view taken at right angles to that of Fig. 2, and on line III—III, Fig. 2; Figs. 4 to 7 vertical sections through the apparatus shown in Figs. 2 and 3, taken respectively on lines IV—IV, V—V, VI—VI and VII—VII; and Fig. 8 a plan view of the thermocouple element shown in Figs. 2 and 3.

The invention is predicated upon my discovery that in the determination of carbon monoxide in a gaseous atmosphere, such as in air, by the use of a body of catalyst whose temperature is increased in consequence of the combustion of the carbon monoxide, its stated objects may be attained by heating the air, or other atmosphere to be tested, prior to its contact with the catalyst, to a temperature above the boiling point of water.

I have found that when the atmosphere passed into contact with the catalyst is heated to such a temperature, the disadvantageous results of water vapor are eliminated. Thereby the use of drier, heretofore considered essential in the use of such catalysts, is not necessary, and a continuously operating, simple and reliable apparatus, not requiring frequent attention, suffices for production of accurate and reliable results.

Apparatus built and operated in accordance with the invention is not only compact and not unduly expensive, but also it requires attention only at infrequent intervals so that it can be relied upon to give warning of the presence of objectionable concentrations of carbon monoxide without being subject to the foregoing and other disadvantages that have militated against the use of prior apparatus for the purposes contemplated.

Having reference now to Fig. 1, undried air to be tested is drawn by a fan 1 mounted in a closed casing 2 and operated by a motor 3. The air enters housing 2 through an intake 4 preferably of funnel shape to provide a large area at its outer end which advantageously is provided with a filtering element 5 having low resistance to passage of the air therethrough. These features cooperate to permit the use of small light-duty motors. The air, freed from dust and dirt by filter element 5, is forced by fan 1 into a conduit 6 provided with means for heating the air to a temperature above the boiling point of water, suitably to a temperature of about 125° to 140° C. In the embodiment shown the air is heated by a tubular electric resistance heater 7.

Upon leaving heater 7 the heated air stream is divided, as by a baffle member 8, into two branch streams which are passed in parallel, one over a catalytically active body 9 of catalyst capable of oxidizing any carbon monoxide contained in the air, and the other over a catalytically inactive compensating body 10.

The temperature increase within the catalytically active body 9 due to combustion of carbon monoxide may be measured in any suitable manner, as by a thermoelement 11 embedded therein. Advantageously, the thermoelement takes the form of a plurality of thermocouples connected in series and having their hot junctions embedded in the catalytically active body 9, and their cold junctions embedded in the catalytically inactive body 10.

Thermoelement 11 is associated with suitable means for indicating the presence of carbon monoxide. This may take the form of a meter or recording mechanism, but for most purposes it is preferred to use an indicating, or alarm, device, such as an alarm bell, horn, or light, which will be actuated when the air passing through the apparatus contains an undesirable concentration of carbon monoxide. For most purposes the alarm device should continue to give its signal, and to this end there is used a relay, or other actuating means, which will maintain the signal in operation until the relay is manually reset. This assures attention to the alarm, or signal, and the condition of the atmosphere which it represents.

With further reference to Fig. 1, motor 3 is operated by electric current supplied through wires 12 and 13 from a suitable source, and heater 7 is connected by wires 14 and 15 to the same source. The terminals of thermoelement 11 are connected by wires 16 and 17 to a suitable device, as just referred to, which in the embodiment shown comprises a relay 18 controlling an alarm bell 19 and supplied with electric current, suitably from the source which supplies it to the fan and heater, through wires 20 and 21. Relay 18 is so constructed that when the temperature in catalytically active body 9 reaches a point corresponding to a predetermined concentration of carbon monoxide, say, 2 parts in 10,000, the relay circuit will be closed to cause the alarm bell to ring.

An apparatus particularly adapted for the practice of the invention is shown in Figs. 2 to 8. It comprises a tubular canister 22 having at its upper end a flange 22a to which is connected a fan housing member 23 having lower flange 23a. The canister may be enclosed in a sheath of felt, or the like, 22b. Mounted within housing 23 is a fan 24 whose shaft 25 is connected to an electric motor 26. Advantageously, and as shown in Fig. 2, motor 26 is carried by a bracket 27 associated with the fan housing, thus simplifying the structure and rendering it quite compact.

The fan housing is provided with an inlet conduit 28 which terminates at its outer end in an enlarged funnel-shaped portion 29 exposed to the atmosphere which is to be tested. The opening of the funnel is preferably provided with a filter element 30 adapted to remove dust and grit contained in the air, without, however, materially increasing the resistance to the passage of air into the funnel. The filter may be, and preferably is, mounted by having its edge engaged peripherally between the rim of the funnel 29 and a perforated screw cover 31, as seen in Fig. 2.

Air drawn into housing 23 by fan 24 is forced downwardly by the fan into canister 22 and through an electric heater which in the embodiment shown comprises an electric resistance heater 32 of any suitable construction provided with a centrally positioned bore 33. A diaphragm member 34 provided with an aperture 34a is mounted within the canister above the heater with aperture 34a aligned with bore 33 to compel substantially all of the air to pass through the heater bore. In traversing the heater the air is heated as described hereinabove.

At its lower end the heater rests upon a sheet metal diaphragm member 35 having a central aperture 36 for egress of the heated air. Immediately below member 35 is a sheet metal member 37 having portions 38 down-struck at opposite sides which rest upon a sheet metal diaphragm member 39 having a centrally positioned opening 40.

The heater is supplied with electric current through leads 12a and 13a.

In the lower part of the canister is a pair of spaced wire screens 41 and 42 which support bodies of catalytically active catalyst material 43 and catalytically inactive catalyst material 44. These bodies are preferably separated from each other to avoid thermal transfer between them, which increases the reliability and accuracy of the apparatus. This may be accompanied by an insulating box-like member 45 which extends across the canister to divide the space between screens 41 and 42 into separate chambers which receive the bodies 43 and 44 of catalytically active and inactive catalyst material. This member 45 is suitably filled with "Bakelite" cement or the like, 45a.

The temperature changes within the catalytically active body 43 are determined by means of the thermoelement comprising a plurality of thermocouples 46 having their hot junctions embedded in body 43 and their cold junctions embedded in the body 44. Such an element may suitably be constructed as indicated in Fig. 8; a plurality of wires 47 and 48 of metal or alloy suited for forming thermocouples are disposed on opposite sides of a mica plate 49, their ends being joined as shown to form a group of couples having hot junctions 50 aligned on one side, and cold junctions 51 aligned on the other side of the mica plate 49.

The terminals of the thermoelement are connected by leads 14a and 15a to posts 52 and 53 mounted exteriorly of the canister for connection to a relay or other electrical device as described above. This may take the form of a relay, or more suitably a meter-relay, such as that known as the Weston Model 705, shown at page 4 of the Weston Electric Instrument Corp. Catalogue entitled "Weston Relays", Circular B-1-A5M9. For most purposes this is calibrated so that at a concentration of 0.02 per cent of carbon monoxide the movement of the meter pointer will close the relay circuit and operate an alarm bell in the manner indicated in Fig. 1.

In the use of the apparatus the motor is started which causes air to be drawn through funnel 29 into housing 23 whence it is forced through heater 32 and downwardly through the canister. After it leaves plate 39 the stream of heated air is divided into branch streams by insulating member 45, one of which passes through bed 43 of catalytically active material, and the other of which passes through bed 44 of catalytically inactive material. Any carbon monoxide in the air is oxidized by the catalytically active material with a consequent rise of temperature of material in bed 43. When the concentration reaches a predetermined value, to which the relay is adjusted, the relay or other device associated with the thermo-element is actuated to operate the alarm. After passing through the beds 43 and 44 the air is exhausted through an opening 54 in the bottom of the canister.

I now prefer to use the carbon monoxide catalyst known to the trade as Hopcalite as the active material, and to use spent, or inactive, Hopcalite as the inactive material, the two beds being preferably of substantially equal size. Since the material in the two beds is of the same composition, and since the beds are of the same size, their thermal capacities are alike; this eliminates inaccuracies which might arise from using beds of different thermal capacities.

Since the apparatus is operated electrically, its operation is fully automatic. Extended experience has shown that in the practice of the invention the harmful effects of water vapor upon Hopcalite, as referred to hereinabove, are so repressed that the apparatus can be used continuously over quite extended periods of time. Since no drier or the like ancillary means are needed, the only attention required is an occasional renewal of the catalytically active material. This does not have to be renewed so frequently, however, as to be a burden, and the period of satisfactory operating life is such that with these occasional renewals entirely satisfactory protection is afforded. For the purpose of renewing the material the canister is provided on one side with openings at the ends of beds 43 and 44 through which the material may be withdrawn and fresh material inserted, these openings being closed suitably by handscrews 55.

It will be appreciated that the apparatus thus provided is extremely simple and compact, and is adapted for installation not only in industrial establishments, but also for home and the like domestic uses.

Various changes may be made without departing from the invention. For instance, the air may be drawn through the apparatus instead of being forced through it as in the embodiment shown. Likewise, instead of heating a single stream of air which is thereafter sub-divided, two streams of air, one directed to each bed of the testing cell, may be heated separately. Also, the relay, or other signal-actuating means, may be used to energize auxiliary mechanism, such as ventilating means, or the like, for remedying the presence of carbon monoxide, or too great a concentration thereof. Obviously, various other changes may likewise be made.

Although the invention has been described with particular reference to the determination of carbon monoxide in air, it will be understood that it is equally applicable to the determination of other combustible constituents in air or other gaseous atmospheres since such materials result in an increase in temperature of the catalytically active material.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. In catalytic testing of a gaseous atmosphere for determination of a particular constituent by an oxidizing catalyst which causes oxidation of said constituent at normal temperature but which is sensitive to water, the steps comprising heating a stream of the atmosphere to a temperature above the boiling point of water, and passing the atmosphere while thus heated into contact with a body of said catalyst.

2. In a method according to claim 1, the step of heating said atmosphere to a temperature of about 125° to 140° C.

3. In a catalytic testing of gaseous atmospheres for determination of a particular constituent by an oxidizing catalyst capable of effecting oxidation thereof at normal temperature but which is sensitive to water, the steps comprising dividing a stream of said atmosphere into two branch streams, heating at least one of said branch streams to a temperature above the boiling point of water, passing said heated branch stream into contact with a body of catalytically active oxidizing catalyst capable of oxidizing said constituent, and passing said other branch stream into contact with a body of said catalytic material in non-catalytic condition.

4. In catalytic testing of gaseous atmospheres for determination of a particular constituent by an oxidizing catalyst capable of effecting oxidation thereof at normal temperature but which is sensitive to water, the steps comprising dividing a stream of said atmosphere into two branch streams, heating at least one of said branch streams to a temperature above the boiling point of water, passing said heated branch stream into contact with a catalytically active body of oxidizing catalyst capable of causing oxidation of said constituent, passing said other branch stream into contact with a non-catalytic body of said catalytic material, whereby said constituent is oxidized exothermically by said catalytically active body, and applying the heat of said reaction to signal its occurrence.

5. That method of determining carbon monoxide in air which comprises the steps of continuously passing in parallel, untreated streams of air heated to a temperature above the boiling point of water, one into contact with a catalytically active body of catalyst capable of oxidizing carbon monoxide having the hot junction of a thermocouple embedded therein, and the other into contact with a similar catalytically inactive body of the same material having embedded therein the cold junction of said thermocouple, and applying the E. M. F. created in said thermocouple by carbon monoxide present in the air to indicate its presence.

6. Gas testing apparatus comprising a heater of sufficient capacity to raise the temperature of gas to be tested above the boiling point of water, a test unit associated with the outlet of said heater and provided with passages for the flow of separate streams of gas from the heater, a catalytically active body of catalytic material in one of said passages, a catalytically inactive body of said material in the other of said passages, a thermoelement having its hot and cold junctions embedded respectively in the active and inactive material of the said passages, and means for passing untreated gas through said heater and cell.

7. Gas testing apparatus comprising a heater of sufficient capacity to raise the temperature of gas to be tested above the boiling point of water, a test unit associated with the outlet of said heater and provided with passages for the flow of separate streams of gas from the heater, a catalytically active body of catalytic material in one of said passages, a catalytically inactive body of said material in the other of said passages, a thermocouple having its hot and cold junctions embedded respectively in the active and inactive material of the said passages, means for passing untreated gas through said heater and cell, and means associated with said thermocouple responsive to temperature changes of said hot junction.

8. Gas testing apparatus comprising a canister, a heater disposed in said canister and of sufficient capacity to raise the temperature of gas to be tested above the boiling point of water, a test unit mounted in said canister below the outlet of said heater and provided with passages for the flow of separate streams of gas from the heater, a catalytically active body of catalytic material in one of said passages, a catalytically inactive body of said material in the other of said passages, a thermocouple having its hot and cold junctions embedded respectively in the material of the said passages, a fan housing mounted on said canister above said heater, and a fan mounted in said housing, said housing being provided with an inlet for air and with an outlet for passing air to said heater.

STANLEY D. PRICE.